US012397464B2

(12) United States Patent
Liu et al.

(10) Patent No.: US 12,397,464 B2
(45) Date of Patent: Aug. 26, 2025

(54) DEVICE FOR MOUNTING A TOOLING BOARD IN A FLAT BED DIE-CUTTING, STRIPPING OR BLANKING MACHINE

(71) Applicant: BOBST MEX SA, Mex (CH)

(72) Inventors: Shelly Liu, Shanghai (CN); Bernard Jaquet, Rue (CH)

(73) Assignee: BOBST MEX SA, Mex (CH)

( * ) Notice: Subject to any disclaimer, the term of this patent is extended or adjusted under 35 U.S.C. 154(b) by 566 days.

(21) Appl. No.: 17/760,226

(22) PCT Filed: Jan. 22, 2021

(86) PCT No.: PCT/EP2021/051509

§ 371 (c)(1),
(2) Date: Aug. 5, 2022

(87) PCT Pub. No.: WO2021/160410

PCT Pub. Date: Aug. 19, 2021

(65) Prior Publication Data

US 2023/0021706 A1 Jan. 26, 2023

(30) Foreign Application Priority Data

Feb. 13, 2020 (EP) .................................... 20020068

(51) Int. Cl.
*B26D 7/26* (2006.01)
*B25B 5/06* (2006.01)

(52) U.S. Cl.
CPC ............ *B26D 7/2614* (2013.01); *B25B 5/067* (2013.01); *B25B 5/061* (2013.01); *B26D 2007/2607* (2013.01)

(58) Field of Classification Search
CPC ....... B25B 1/18; B25B 5/02–04; B25B 5/061; B25B 5/087; B25B 5/122; B25B 5/067;
(Continued)

(56) References Cited

U.S. PATENT DOCUMENTS 2,096,574 A * 10/1937 Denny ..................... B21D 7/06 269/25
2,747,535 A * 5/1956 Curry ....................... B21D 7/14 269/238
(Continued)

FOREIGN PATENT DOCUMENTS

CN 201471829 U 5/2010
CN 204136117 U 2/2015
(Continued)

OTHER PUBLICATIONS

European Patent Office, International Search Report, PCT/EP2021/051509, Apr. 20, 2021, 3 pages, Europe.

*Primary Examiner* — Tyrone V Hall, Jr.
(74) *Attorney, Agent, or Firm* — Bookoff McAndrews, PLLC

(57) ABSTRACT

A mounting device (12) for mounting a tooling board (14) in a flat bed die-cutting, stripping or blanking machine comprises at least one first clamping jaw (38) which is moveable from an unlocked position, in which a tooling board (14) may be removed from or inserted into the machine, to a locked position, in which a tooling board (14) may be fixed in the machine, at least one actuator (18) which comprises a moveable piston (54) and a piston rod (56) coupled to the piston (54), wherein the actuator (18) is configured to transfer the at least one first clamping jaw (38) from the locked position to the unlocked position, and wherein the actuator (18) is coupled to the at least one clamping jaw (38) via an attachment point (60) which has a fixed position relative to the first clamping jaw (38). Furthermore, a mounting assembly (10) comprising a mounting device (12) is provided.

12 Claims, 6 Drawing Sheets

(58) Field of Classification Search
CPC ... B25B 5/142; B25J 15/0253; B25J 15/0293; B26D 7/2614; B26D 7/26; B26D 2007/26; B26D 2007/2607; B26D 2007/2614
See application file for complete search history.

(56) References Cited

U.S. PATENT DOCUMENTS

| | | | | | |
|---|---|---|---|---|---|
| 2,776,854 | A | * | 1/1957 | Billstrom ................ | B25B 5/061 292/96 |
| 4,541,828 | A | * | 9/1985 | Polic ..................... | B30B 15/026 493/473 |
| 5,114,394 | A | | 5/1992 | Madsen | |

FOREIGN PATENT DOCUMENTS

| | | | |
|---|---|---|---|
| CN | 206551091 | U | 10/2017 |
| CN | 206899258 | U | 1/2018 |
| CN | 207283364 | U | 4/2018 |
| CN | 207843490 | U | 9/2018 |
| CN | 208034802 | U | 11/2018 |
| CN | 209175891 | U | 7/2019 |
| CN | 110340968 | A | 10/2019 |
| CN | 209666546 | U | 11/2019 |
| CN | 209851025 | U | 12/2019 |
| DE | 10252549 | A1 | 5/2004 |
| EP | 1418030 | A1 | 5/2004 |
| GB | 663501 | | 12/1951 |
| JP | S62130894 | U | 8/1987 |
| JP | H01-37920 | U | 3/1989 |
| JP | H01148295 | U | 10/1989 |
| JP | S63043880 | | 10/1989 |
| JP | 2004036729 | A | 2/2004 |
| JP | 2004269125 | A | 9/2004 |
| JP | 5507719 | B | 5/2014 |
| JP | 2008044027 | B1 | 5/2014 |
| KR | 20080072816 | A | 8/2008 |
| KR | 1020110101925 | | 9/2011 |
| KR | 101389549 | B1 | 4/2014 |
| KR | 101509219 | B1 | 4/2015 |
| KR | 20170063770 | A | 6/2017 |
| KR | 20180002238 | A | 1/2018 |
| TW | I519458 | B | 2/2016 |

* cited by examiner

DEVICE FOR MOUNTING A TOOLING BOARD IN A FLAT BED DIE-CUTTING, STRIPPING OR BLANKING MACHINE

CROSS-REFERENCE TO RELATED APPLICATION(S)

This patent application is a National Stage Application under 35 U.S.C § 371 of International Patent Application No. PCT/EP2021/051509, filed on Jan. 22, 2021, which claims priority to European Patent Application No. 20020068.1, filed on Feb. 13, 2020, the entireties of which are incorporated herein by reference.

The invention relates to a mounting device for mounting a tooling board in a flat bed die-cutting, stripping or blanking machine and to a mounting assembly comprising a mounting device.

Flat bed die-cutting machines, flat bed stripping machines or part separation machines may be part of a production line in which paper, cardboard, corrugated board or plastic are processed, in particular for packaging. For example, a plurality of blanks on the same sheet are die-cut and subsequently separated in a flat bed die-cutting machine with an adjoining flat bed stripping device.

In order to enable the processing of different packaging, an exchangeable tooling board which is specific for a kind of packaging to be processed is mounted in the respective machine. For flat bed die-cutting machines these tooling boards may be for example pressure plates which have cutting knives or pressure pads attached thereto. The tooling boards are usually inserted into the machine from the side with respect to the transport direction of the workpiece. Tooling boards may further be so called universal tools.

It is essential that the machines work with very high precision. The exchangeable tooling board must therefore be exactly aligned with the edges of cut in the preceding station and held in a stable position in order to remain exactly aligned. If upper and lower exchange tools are provided, as it is the case in the die-cutting or stripping machines, these tools further need to be precisely aligned with each other.

For mounting an exchangeable tooling board in flat bed die-cutting, stripping or blanking machines, these machines usually comprise clamping and adjustment mechanisms. However, the known mechanisms are usually complicated, comprise a large number of parts and are thus expensive with regard to material input and mounting time.

It is thus an object of the present invention to provide a mounting assembly for a flat bed die-cutting, stripping or blanking machine which is cost effective and easy to assemble.

This object is achieved by a mounting device for mounting a tooling board in a flat bed die-cutting, stripping or blanking machine, comprising at least one first clamping jaw which is moveable from an unlocked position, in which a tooling board may be removed from or inserted into the machine, to a locked position, in which a tooling board may be fixed in the machine, at least one actuator which comprises a moveable piston and a piston rod coupled to the piston, wherein the actuator is configured to transfer the at least one first clamping jaw from the locked position to the unlocked position, and wherein the actuator is coupled to the at least one first clamping jaw via an attachment point which has a fixed position relative to the first clamping jaw.

By means of the actuator being coupled to the at least one clamping jaw via an attachment point which has a fixed position relative to the clamping jaw, the assembly of the mounting device is particularly simple and only a little number of separate parts has to be handled. In contrast to previous mounting devices, there is no gear present connecting the actuator with the clamping jaw. That means, after assembling the mounting device, the position of the actuator relative to the clamping jaw is fixed and cannot be adjusted. This allows keeping the production costs low and the mounting device can be assembled quickly.

Preferably, the attachment point is provided directly at the clamping jaw or at a coupling element which is fixed to the clamping jaw, i. e. the actuator may be directly coupled to the clamping jaw or via a coupling element. The coupling element may be a distance piece which serves to overcome a gap between the actuator and the clamping yaw, if necessary.

When the actuator is actuated, its length may be increased compared to its length in the non-actuated state.

According to one embodiment, the actuator is coupled to the first clamping jaw via a swivel joint. Due to the swivel joint, the actuator can buckle out in order to overcome geometric and positional tolerances.

The rotation axis of the swivel joint may be transverse to the moving direction of the clamping jaw.

The mounting device for example comprises at least one closing spring which is arranged so as to move the first clamping jaw towards its locked position.

Thereby, the mounting device may be operated particularly energy-efficient. In particular, the clamping jaw can be reliably held in the locked position by the closing spring when the actuator is not actuated. Thus, no electric energy has to be provided to hold the first clamping jaw in its locked position.

The actuator only needs to be actuated for a short time to move the first clamping jaw from the locked position to the unlocked position when a tooling board needs to be exchanged.

For example, the closing spring is compressed when the actuator is actuated, thereby storing elastic energy which can be used to move the first clamping jaw from the unlocked position in the locked position.

According to one embodiment, the closing spring is clamped between a first abutment surface at the piston rod and a second abutment surface which has a fixed position in the mounting device. Thereby, the closing spring is held in a defined position. Due to the first abutment surface being comprised by the piston rod, a compact design is achieved.

The closing spring may be arranged coaxial with the piston rod and in particular surrounds the piston rod. Thus, the piston rod serves as a guide for the closing spring such that the spring does not buckle when it is compressed by the actuator.

The mounting device has for example a linear guide for support and movement of the clamping jaw. Consequently, the clamping jaw is moved with high precision.

In particular, the clamping jaw comprises at least one guiding portion which is made of sheet metal, wherein the actuator is coupled to the guiding portion. Sheet metal parts can be produced very easy and cheap. By using sheet metal parts, the total costs for the mounting device may be particularly low.

According to one embodiment, the guiding portion has at least one elongated slit which extends in the moving direction of the clamping jaw and wherein the mounting device has at least one protrusion which extends through the slit and thereby guides the clamping jaw. Thereby, a simple and effective linear guide is provided.

In order to provide a particularly stable mounting for the tooling board, the mounting device may further comprise a clamping profile which is fastened to the clamping jaw and which is configured to engage the tooling board. The clamping jaw is therefore not in direct engagement with the tooling board. The profile allows the clamping force applied by the clamping jaw to be distributed more evenly on the tooling board such that the tooling board is held in its mounting position particularly stable.

The clamping profile preferably engages the tooling board along its entire length.

For example, the clamping jaw and the clamping profile are connected to each other by screwing, welding etc.

However, according to an alternative embodiment, the clamping profile may be omitted and the clamping jaw may directly engage the tooling board.

According to one embodiment, the mounting device comprises at least one second clamping jaw which constitutes a counter bearing to the at least one first clamping jaw, wherein the first and the second clamping jaws are configured to clamp a tooling board between each other, in particular either directly or via the clamping profile. This also contributes to the tooling board being held in its mounting position stable. In particular, due to the second jaw constituting a counter bearing, a sufficient holding force is exerted on the tooling board to inhibit an unwanted shifting of the tooling board during an operation of the machine.

Preferably, the first clamping jaw and the second clamping jaw are existing in duplicate, in order to provide a sufficient bearing for the tooling board.

In this case, the clamping profile connects the two first clamping jaws and a further clamping profile connects the two second clamping jaws.

The actuator may be fixed to the second clamping jaw, either directly or via a coupling element. Consequently, due to the actuator being coupled to the first clamping jaw and being fixed to the second clamping jaw, the distance between the first and the second clamping jaws is increased by an actuation of the actuator in order to insert a tooling board in the mounting device. Thereby, a simple opening mechanism for the mounting device is provided.

The mounting device may further comprise at least one adjustment device which is configured to adjust the position of the tooling board in the machine. Thereby, the position of the tooling board can be fine-tuned with high precision.

For example, the adjustment device comprises a setting screw which can be operated by a user in order to adjust the position of the tooling board. Thus, the operation of the adjustment device is very simple.

In particular, by means of the adjustment device the at least one second clamping jaw can be displaced along a direction of movement of the clamping jaws. Preferably, the displacement of the second clamping jaw is a linear displacement. The direction of movement of the clamping jaws thus corresponds to board travel direction. By means of a displacement of the at least one second clamping jaw, the position of the tooling board in the machine is shifted.

According to one embodiment, at least one bridge is provided having opposite end portions, wherein the first clamping jaw is displaceably mounted to a first end portion of the bridge and the second jaw is displaceably mounted to the opposite, second end portion of the bridge. Thus, the bridge serves as a mount for the clamping jaws and additionally gives the mounting device sufficient stability. In particular, the bridge extends from one side of the mounting device to the opposite side of the mounting device.

The object is further achieved by a mounting assembly comprising a mounting device as previously described and a frame and/or a tooling board which can be removably displaceable mounted in the mounting device by the at least one first clamping jaw, wherein a tooling board is attachable to the frame. The frame serves as an adapter for differently sized tooling boards. This allows to keep the mounting device particularly simple because there is no need to provide complicated adjustment means which allow an adjustment of the mounting device to differently sized tooling boards.

Tooling boards which have a size fitting into the mounting device can be directly mounted in the mounting device and be fixed by means of the clamping jaws. In this case, there is no need of a frame. If the tooling board is smaller or larger than a size fitting into the mounting device, the frame may be releasably attached to the tooling board, for example by screwing, and the frame can be mounted in the mounting device with the attached tooling board. In this case, the frame is clamped in the mounting device and not the tooling board.

Further features and advantages of the invention can be derived from the following description and from the enclosed Figures. In the drawings.

Figure 3:
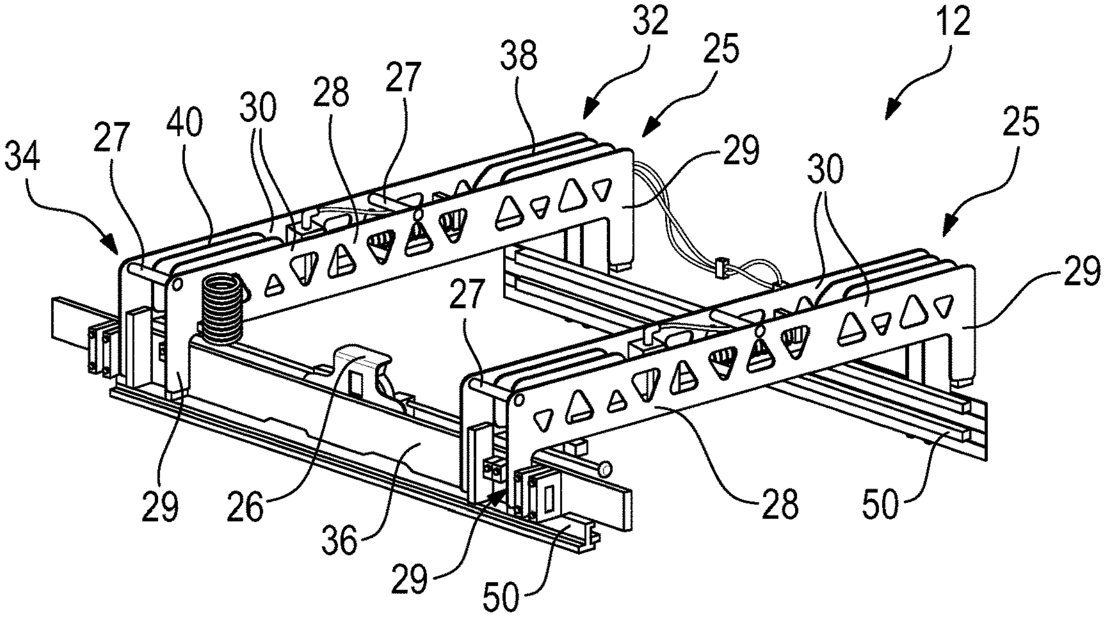
FIG. 3 shows an inventive mounting device in a perspective view.
Figure 4:
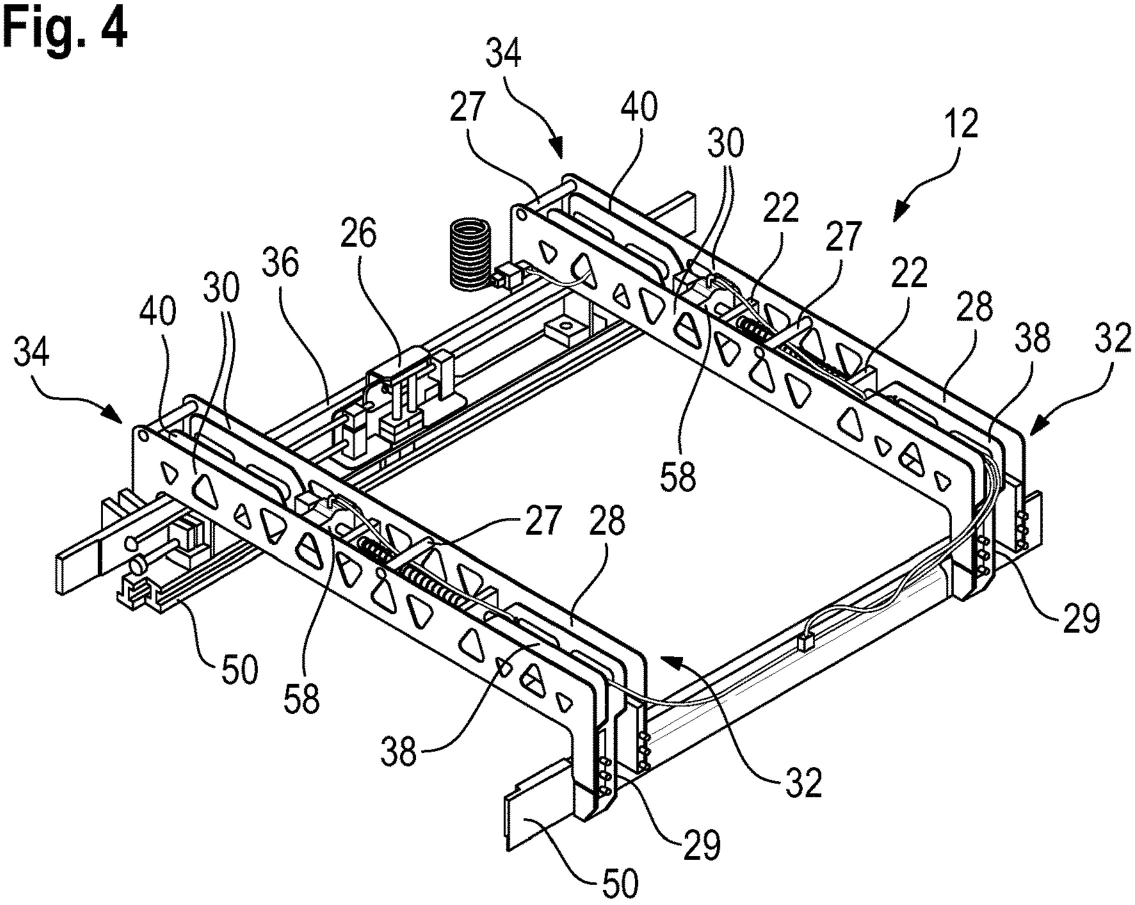
Figure 5:
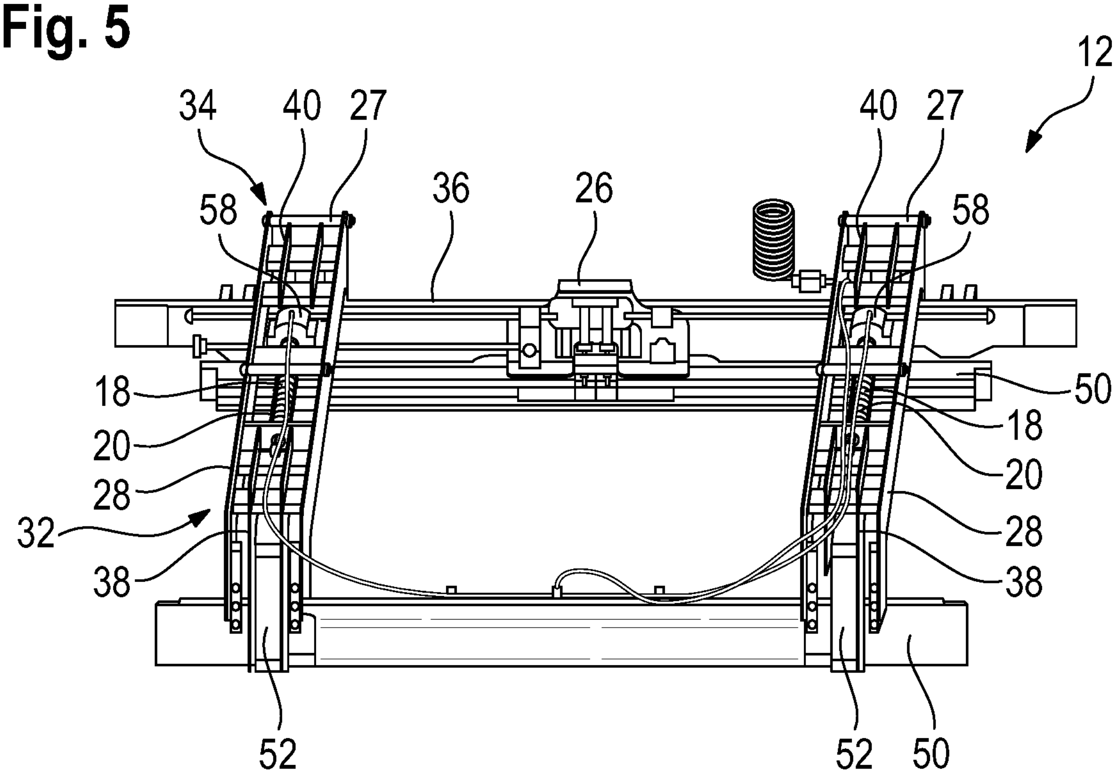
Figure 6:
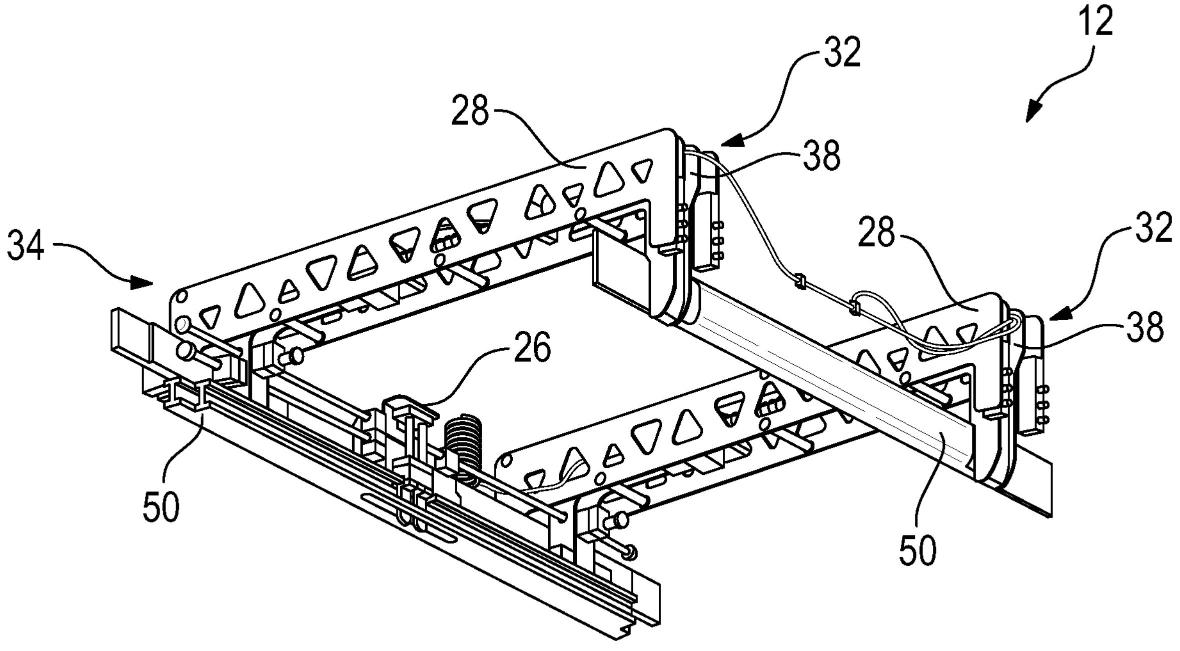
Figure 7:
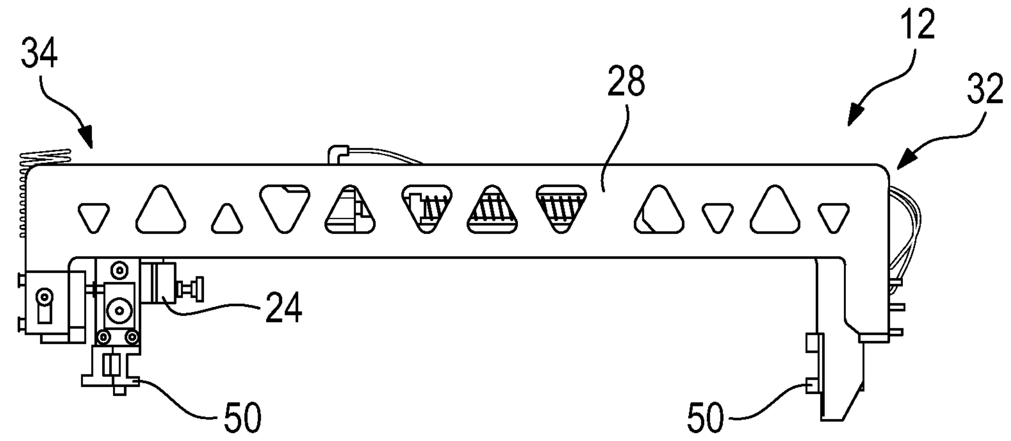
Figure 8:
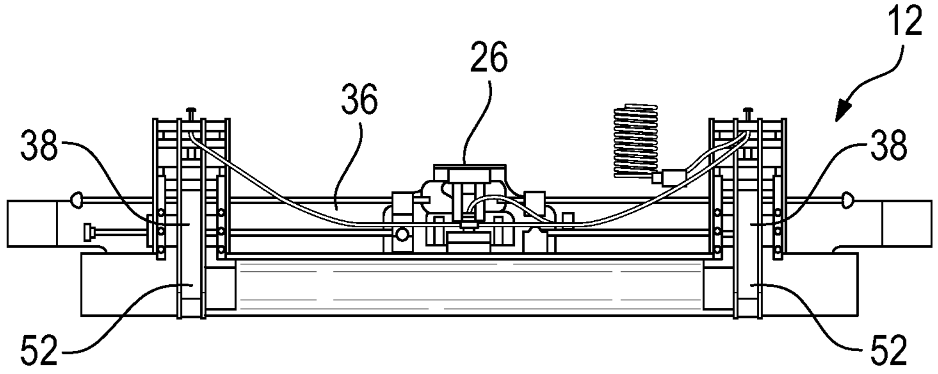
Figure 9:
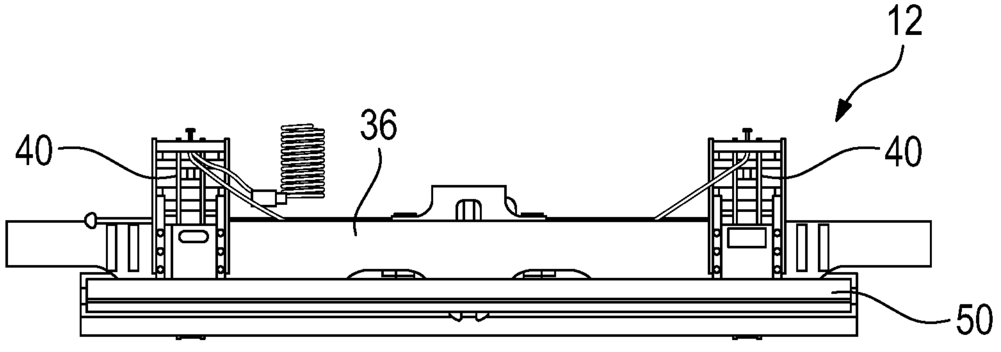
Figure 10:
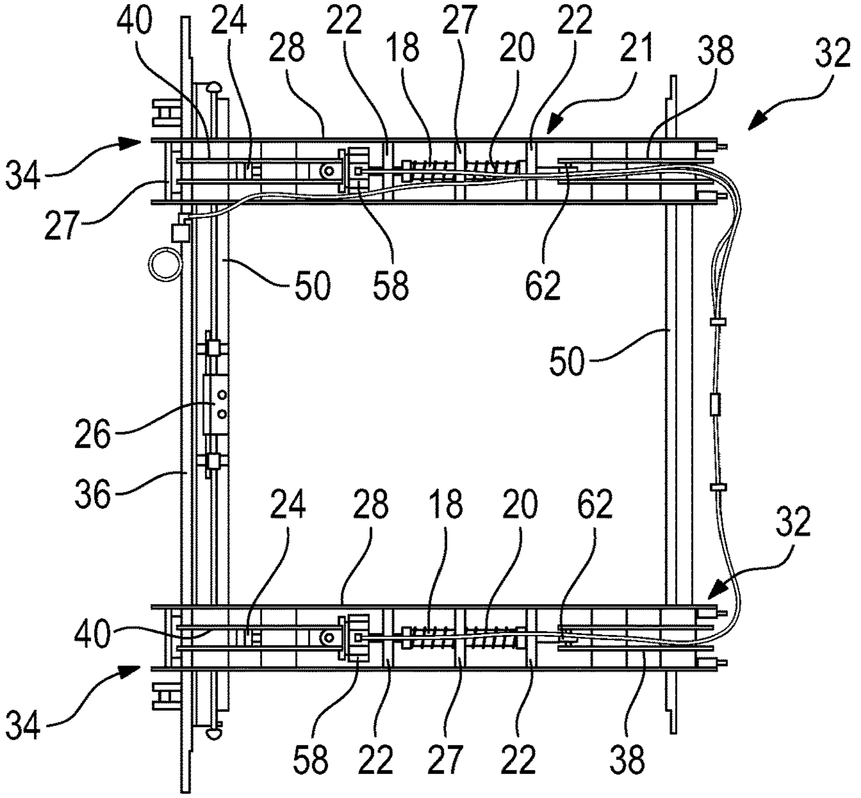
Figure 11:
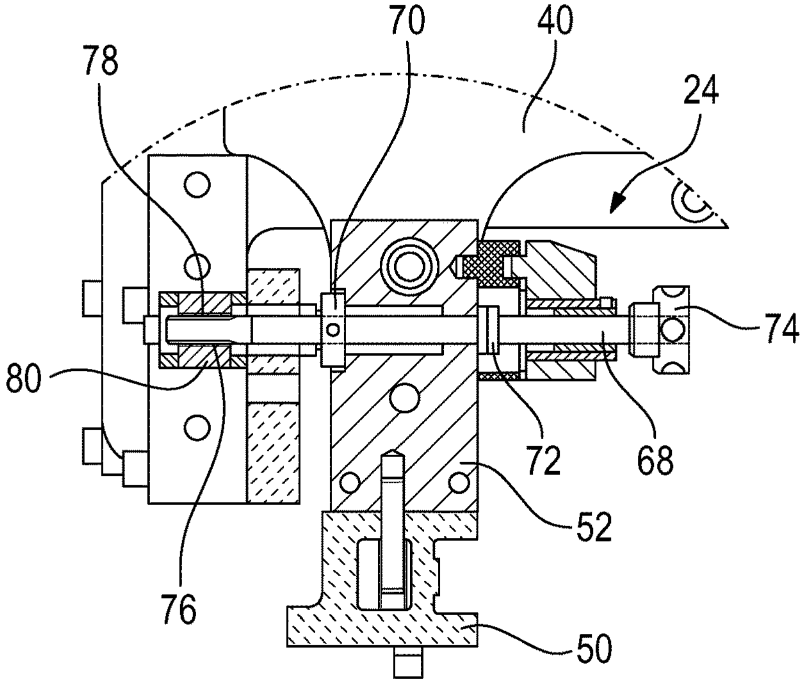
Figure 12:
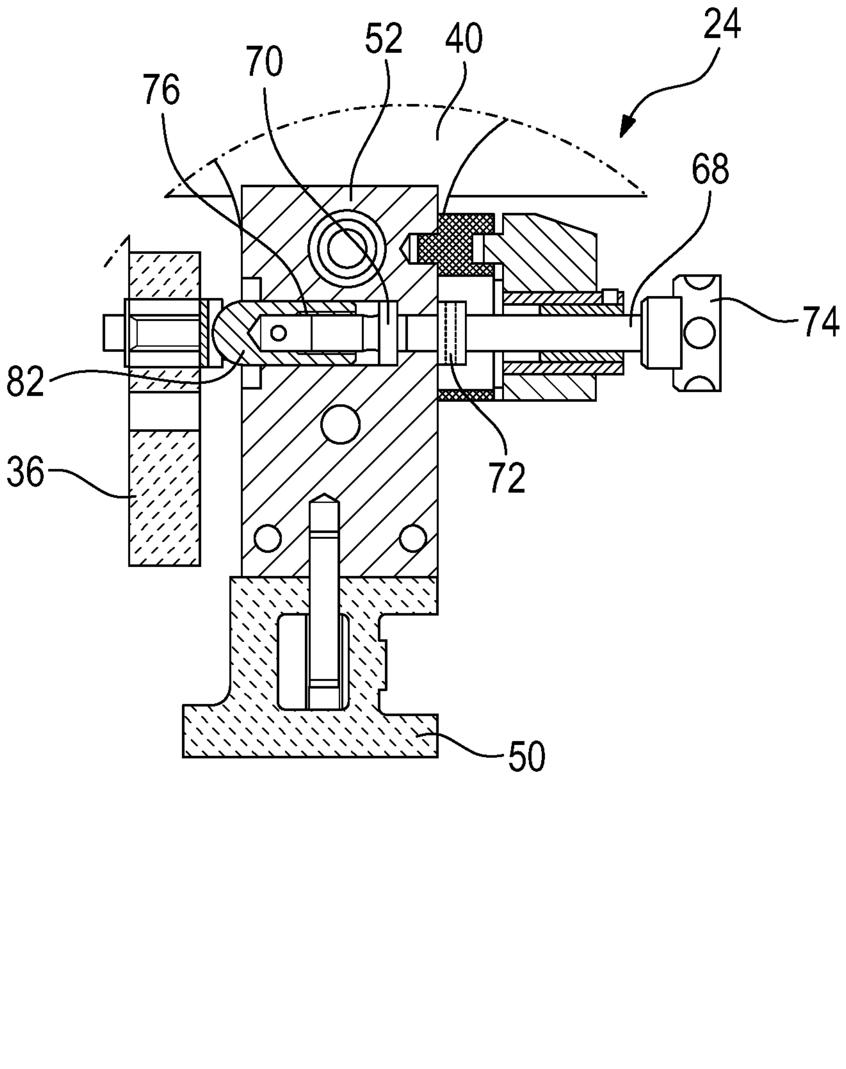

FIG. 4 shows the mounting device of FIG. 3 in a further perspective view, FIG. 5 shows the mounting device of FIG. 3 in a further perspective view, FIG. 6 shows the mounting device of FIG. 3 in a further perspective view, FIG. 7 shows the mounting device of FIG. 3 in a side view, FIG. 8 shows the mounting device of FIG. 3 in a front view, FIG. 9 shows the mounting device of FIG. 3 in a back view, FIG. 10 shows the mounting device of FIG. 3 in a top view, FIG. 11 shows a section through an adjustment device of the mounting device according to the invention, and FIG. 12 shows a section through an alternative adjustment device of the mounting device according to the invention.

Figure 1:
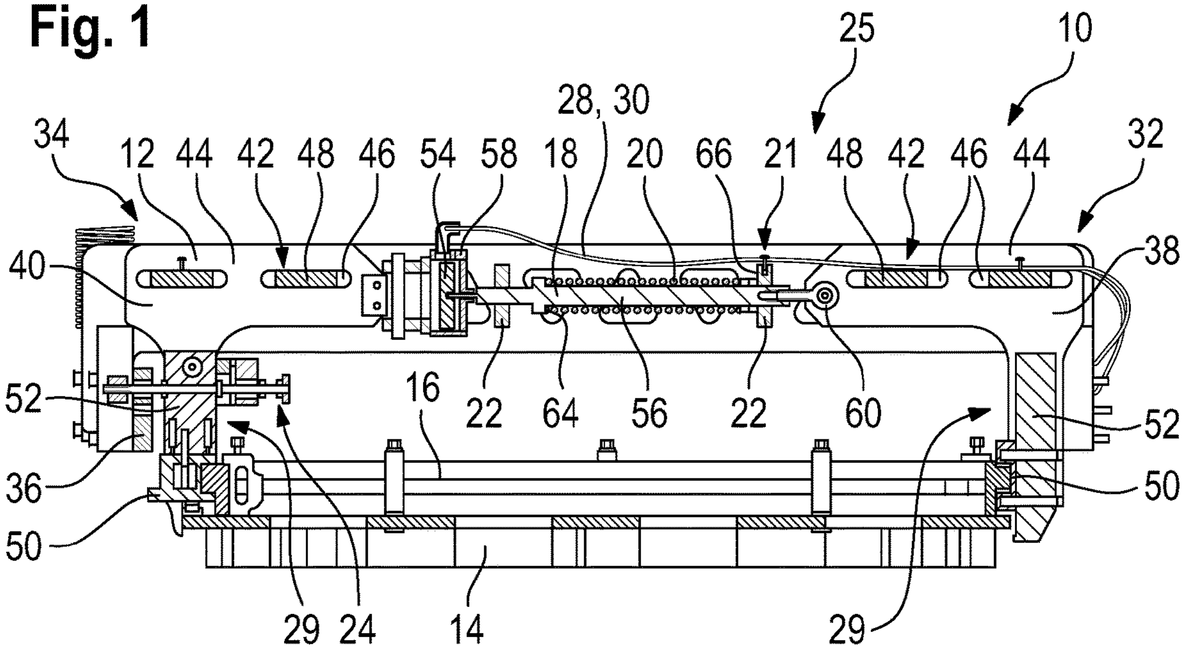
FIG. 1 shows a longitudinal section through an inventive mounting assembly comprising an inventive mounting device, wherein the mounting device is in a locked condition.
Figure 2:
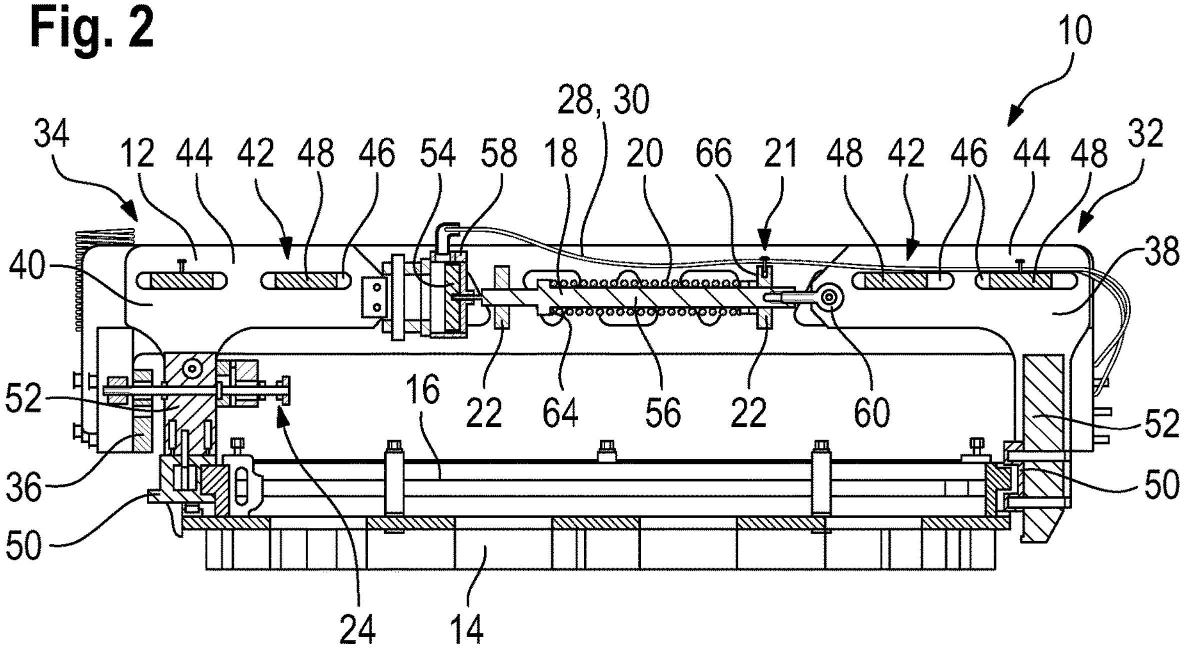
FIG. 2 shows a longitudinal section through the mounting assembly of FIG. 1, wherein the mounting device is in an unlocked condition.

FIGS. 1 and 2 each show a longitudinal section through an inventive mounting assembly 10.

The mounting assembly 10 comprises a mounting device 12 for mounting a tooling board 14 in a flat bed die-cutting, stripping or blanking machine. In FIG. 1 the mounting device 12 is shown in a locked condition while in FIG. 2 the mounting device is shown in an unlocked condition.

The mounting device 12 may hold the tooling board 14 or the tooling board 14 and a frame 16, wherein the frame 16 is attached to the tooling board 14 and serves as an adapter to mount the tooling board 14 in the mounting device 12, since the tooling board 14 which is illustrated in FIG. 1 is too broad to fit in the mounting device 12. In particular, by means of the frame 16, tooling boards 14 of different sizes can be mounted in a in a flat bed die-cutting, stripping or blanking machine.

However, if a tooling board 14 has the right dimensions, in can be mounted in the mounting device 12 without the need of a frame 16.

In the following, the mounting device 12 is further described with reference to FIGS. 1 to 10, wherein FIGS. 3 to 10 show the mounting device in more detail and in different views.

The mounting device 12 comprises at least one actuator 18 for shifting the mounting device 12 from a locked condition to an unlocked condition and at least one closing spring 20, which keeps the mounting device 12 in the locked condition when the actuator 18 is not actuated.

A bearing 21 is provided to guide the actuator 18. In the illustrated embodiment, the bearing 21 comprises two guide elements 22.

Moreover, in order to allow a fine adjustment of the tooling board 14 in a flat bed die-cutting, stripping or blanking machine, the mounting device 12 comprises at least one adjustment device 24 (see FIGS. 1 and 2).

Furthermore, the mounting device 12 comprises a centring device 26, which is configured to centre a tooling board 14 in the machine (see FIGS. 3 to 6).

The mounting device 12 comprises two C-shaped beams 25 with a central bridge 28 and arms 29 at the opposite ends of the bridge which protrude downwardly and carry clamping profiles 50. Between the clamping profiles 50 the board 14 can be clamped.

In the illustrated embodiment, each bridge 28 comprises two sheet metal parts 30 which are congruent. The sheet metal parts 30 may be fixed to each other by screws, rivets etc. Additionally, at least two spacer 27 are provided per bridge 28. Each bridge 28 has opposite end portions 32, 34.

One actuator 18 and one closing spring 20 is provided for each bridge 28.

A crossbar 36 connects the bridges 28 on one side of the bridges 28. By means of the crossbar 36, the mounting device 12 may be fixed in a flat bed die-cutting, stripping or blanking machine, for example by screwing.

The bridges 28 and the crossbar 36 respectively the clamping profiles 50 are preferably are aligned perpendicular to each other.

The arms 29 are defined by clamping jaws. A first clamping jaw 38 and a second clamping jaw 40 are mounted on each bridge 28. The second clamping jaw 40 constitutes a counter bearing for the first clamping jaw 38.

The first clamping jaw 38 is displaceably mounted to the first end portion 32 of the bridge 28 and the second clamping jaw 40 is displaceably mounted to the opposite, second end portion 34 of the bridge 28. Thereby, the first clamping jaw 38 and the second clamping jaw 40 are configured to clamp the tooling board 14 or a frame 16 between each other.

The first clamping jaws 38 are moveable from an unlocked position, in which a tooling board 14 respectively a frame 16 may be removed from or inserted into the machine, to a locked position, in which a tooling board 14 or a frame 16 may be fixed in the machine.

In particular, actuator 18 is configured to transfer the at least one first clamping jaw 38 from the locked position to the unlocked position.

The second clamping jaws 40 are also moveable for means of fine adjustment, only. However clamping jaw 40 is not actuated by actuator 18.

For example, each clamping jaw 38, 40 is moveable in the moving direction by about 5 mm to 10 mm.

The mounting device 12 further comprises a linear guide 42 for support and movement of the clamping jaws 38, 40.

As can be best seen in FIGS. 1 and 2, each clamping jaw 38, 40 comprises a guiding portion 44 which is made of sheet metal, in particular of two sheet metal parts which are preferably congruent to each other. However, other materials are also possible.

Each guiding portion 44 has two elongated slits 46 which extend in the moving direction of the clamping jaws 38, 40.

The mounting device 12 has several protrusions 48 which extend through the slits 46 and thereby guide the clamping jaws 38, 40. In the shown embodiment, the protrusions 48 are cuboid chunks which are fastened to the bridge 28.

The guiding portion 44 with the slits 46 and the protrusions 48 together form the linear guide 42.

Furthermore, the clamping profiles 50 are provided which are fastened to the guiding portions 44 of each clamping jaw 38, 40 and which are configured to engage the tooling board 14 or the frame 16, preferably along its entire length. The clamping profiles 50 connect the two first clamping jaws 38 respectively the two second clamping jaws 40 (see FIG. 3).

The clamping jaws 38, 40 each comprise a solid part 52 which is fixed between the two sheet metal parts and thereby holds the sheet metal parts in a fixed position relative to each other. Thus, the solid part 52 ensures a sufficient stability of the clamping jaws 38, 40. The solid part 52 also serves to fasten the clamping profiles 50 to the clamping jaws 38, 40.

The actuator 18 comprises a moveable piston 54 and a piston rod 56 coupled to the piston 54. The moveable piston 54 is contained in a cylinder 58.

The closing spring 20 is arranged coaxial by with the piston rod 56 and in particular surrounds the piston rod 56. Thereby, the piston rod 56 supports and guides the closing spring 20.

The closing spring 20 is arranged so as to move the clamping jaw 38 towards its locked position. In other words, the closing spring 20 pushes the first clamping jaw 38 towards the second clamping jaw 40.

In order to hold the closing spring 20 in a defined position, the closing spring 20 is clamped between a first abutment surface 64 and a second abutment surface 66 (see FIGS. 1 and 2).

In the depicted embodiment, the first abutment surface 64 is comprised by the actuator 18, in particular by the piston rod 56, and the second abutment surface 66 has a fixed position in the mounting device 12. In particular, the second abutment surface is provided at one of the guide elements 22.

However, the abutment surfaces 64, 66 can also be located somewhere else in the machine and the closing spring 20 may be mounted independently from the piston rod 56.

In the depicted embodiment, the actuator 18 is coupled to the first clamping jaw 38 via an attachment point 60 (see FIGS. 1 and 2) which has a fixed position relative to the first clamping jaw 38. Thus, a distance of the actuator 18 to the first clamping jaw 38 is fixed after the mounting device 12 has been assembled. In particular, the actuator 18 is coupled to the guiding portion 44 of the first clamping jaw 38.

The attachment point 60 is provided directly at the first clamping jaw 38. However, it is also possible to provide the attachment point 60 at an additional coupling element which is fixed to the first clamping jaw 38, for example, when a greater distance has to be overcome between the clamping jaw 38 and the actuator 18.

The piston rod 56 is coupled to the first clamping jaw 38 and the cylinder 58 containing the piston 54 is coupled to the second clamping jaw 40. However, the arrangement of parts can also be the other way round.

As can be seen in FIG. 10, the actuator 18 is coupled to the clamping jaw 38 via a swivel joint 62.

FIG. 11 shows a detailed sectional view through the adjustment device 24 shown in FIGS. 1 and 2.

For each of the second clamping jaws 40, one adjustment device 24 is provided.

The adjustment device 24 comprises a setting screw 68 which is fixed to the second clamping jaw 40, in particular such that the setting screw 68 may be rotated with respect to the second clamping jaw 40, but not linearly moved or otherwise shifted with respect to the second clamping jaw 40. More precisely, the setting screw 68 extends through and is fixed to the solid part 52 of the second clamping jaw 40.

This is achieved by two bearings 70, 72 which clamp the second clamping jaw 40 between them. Optionally, one of the two bearings 70, 72 is formed integrally with the setting screw 68, wherein the other bearing 70, 72 is fastened to the setting screw 68.

At one end, the setting screw 68 is provided with a knob 74 which may be grabbed and rotated by a user.

At the other end, the setting screw 68 has a thread 76 which engages a respective internal thread 78 of a nut 80 which is rotationally and linearly fixed in the mounting device 12, for example in the crossbar 36.

Upon rotation of the setting screw 68, the setting screw 68 is screwed into or out of the thread 76 of the nut 80. Thereby, since the nut 80 is fixed, the second clamping jaw 40 is linearly moved in the moving direction of the clamping jaws 38, 40.

FIG. 12 shows a sectional view through an adjustment device 24 according to an alternative embodiment.

This adjustment device is based on the same mechanism as the adjustment device 24 shown in FIG. 11.

However, instead of a nut 80, the adjustment device 24 according to FIG. 12 comprises a bolt 82 with an internal thread, into which the setting screw 68 is threaded.

Upon rotation of the setting screw 68, the setting screw 68 is screwed into the bolt 82 or out of the bolt 82.

The bolt 82 is supported by the crossbar 36, in particular it abuts the crossbar 36 or another element coupled to the crossbar 36 without being firmly fixed to the crossbar 36.

In the following, the handling and functioning of the mounting device 12 is described with reference to the previously described Figures.

If a tooling board 14 needs to be inserted or exchanged, the actuators 18 are actuated. In particular, the actuators 18 are only used to open the mounting device 12, but not for closing the mounting device 12.

The actuation of each actuator 18 takes place by applying pressurized air to the piston 54, in particular by filling the cylinder 58 with pressurized air. Thereby, the piston 54 is moved such that the actuator 18 is extended and the first clamping jaw 38 connected to the actuator 18 is moved from its locked position to its unlocked position. This movement is visualized by FIGS. 1 and 2.

In particular, the first clamping jaw 38 is moved against the force of the closing spring 20.

When the first clamping jaw 38 is moved, the closing spring 20 is compressed, because the abutment surfaces 64, 66 are moved towards each other. Thereby, the closing spring 20 stores elastic energy.

The same movements are simultaneously taking place in the parallel, second bridge 28 and its actuator 18.

In this condition, when the actuators 18 are actuated and the closing springs 20 are compressed, a tooling board 14 or a frame 16 may be inserted into the mounting device 12.

During insertion of a tooling board 14 or a frame 16, the clamping profiles 50 facilitate an easy exchange of the tooling board 14 or the frame 16 because the tooling board 14 or the frame 16 are supported by the clamping profiles 50, even if the mounting device 12 is still in the unlocked condition.

Upon insertion, the centring device 26 engages with the tooling board 14 or the frame 16 and thereby centres the tooling board 14 in the mounting device 12 in a direction perpendicular to the movement direction of the paper or cardboard.

After insertion of a tooling board 14, the actuators 18 may be deactivated, in particular by stopping the supply of pressurized air.

When the air pressure in the cylinder 58 is lowered again, the first clamping jaw 38 is moved back to its locked position due to the spring force of the closing spring 20.

If a fine adjustment of the position of the tooling board 14 is necessary, the second clamping jaws 40 can be displaced along a direction of movement of the clamping jaws 38, 40 by means of the adjustment device 24.

In particular, a user may rotate the knob 74 and thereby move the respective second clamping jaw 40. In particular, upon rotation of the knob 74 respectively the setting screw 68, the second clamping jaw 40 is linearly moved.

The invention claimed is:

1. A mounting device for mounting a tooling board in a machine, the mounting device comprising:
 a first clamping jaw which is moveable from an unlocked position, in which the tooling board may be removed from or inserted into the machine, to a locked position, in which the tooling board may be fixed in the machine; and
 an actuator which comprises a moveable piston and a piston rod coupled to the piston,
 wherein the actuator is configured to transfer the first clamping jaw from the locked position to the unlocked position, and
 wherein the actuator is coupled to the first clamping jaw via an attachment point which has a fixed position relative to the first clamping jaw,
 wherein the actuator is coupled to the first clamping jaw via a swivel joint,
 wherein the mounting device comprises a closing spring which is arranged to move the first clamping jaw towards the locked position, and
 wherein the closing spring is clamped between a first abutment surface of the piston rod and a second abutment surface which has a fixed position in the mounting device.

2. The mounting device according to claim 1, wherein the closing spring is arranged coaxial with the piston rod.

3. The mounting device according to claim 1, wherein the mounting device has a linear guide for support and movement of the first clamping jaw.

4. The mounting device according to claim 1, wherein the first clamping jaw comprises a guiding portion made of sheet metal, wherein the actuator is coupled to the guiding portion.

5. The mounting device according to claim 4, wherein the guiding portion has a slit which extends in a moving direction of the first clamping jaw, and wherein the mounting device has a protrusion which extends through the slit and thereby guides the first clamping jaw.

6. The mounting device according to claim 1, wherein the mounting device comprises a clamping profile which is fastened to the first clamping jaw and which is configured to engage the tooling board.

7. The mounting device according to claim 1, wherein the mounting device comprises a second clamping jaw which constitutes a counter bearing to the first clamping jaw, wherein the first and the second clamping jaws are configured to clamp a tooling board between each other.

8. The mounting device according to claim 7, wherein the actuator is fixed to the second clamping jaw.

9. The mounting device according to claim 7, further comprising a bridge having a first end portion and a second end portion opposite to the first end portion, wherein the first clamping jaw is displaceably mounted to the first end portion of the bridge and the second clamping jaw is displaceably mounted to the second end portion of the bridge.

10. A mounting device for mounting a tooling board in a machine, the mounting device comprising:

a first clamping jaw which is moveable from an unlocked position, in which the tooling board may be removed from or inserted into the machine, to a locked position, in which the tooling board may be fixed in the machine;

an actuator which comprises a moveable piston and a piston rod coupled to the piston;

a second clamping jaw which constitutes a counter bearing to the first clamping jaw; and an adjustment device which is configured to adjust a position of the tooling board in the machine, wherein the actuator is configured to transfer the first clamping jaw from the locked position to the unlocked position, wherein the actuator is coupled to the first clamping jaw via an attachment point which has a fixed position relative to the first clamping jaw, wherein the first and the second clamping jaws are configured to clamp a tooling board between each other, wherein the actuator is fixed to the second clamping jaw.

11. The mounting device according to claim 10, wherein the second clamping jaw is displaceable by the adjustment device along a direction of movement of the first clamping jaw.

12. A mounting assembly comprising:

a mounting device for mounting a tooling board in a machine, the mounting device including:

a first clamping jaw which is moveable from an unlocked position, in which the tooling board may be removed from or inserted into the machine, to a locked position, in which the tooling board may be fixed in the machine;

an actuator which comprises a moveable piston and a piston rod coupled to the piston; and a frame, wherein the frame and/or the tooling board are removably mounted in the mounting device by the first clamping jaw, wherein the tooling board is attachable to the frame, wherein the actuator is configured to transfer the first clamping jaw from the locked position to the unlocked position, wherein the actuator is coupled to the first clamping jaw via an attachment point which has a fixed position relative to the first clamping jaw, and wherein the actuator is coupled to the first clamping jaw via a swivel joint.

* * * * *